May 4, 1965  F. T. RIDDY  3,181,388

BRAKING SYSTEMS FOR VEHICLES

Filed March 27, 1961  5 Sheets-Sheet 1

Inventor:
Frederick T. Riddy
By:
Scrivener & Parker
Attorneys

May 4, 1965

F. T. RIDDY 3,181,388

BRAKING SYSTEMS FOR VEHICLES

Filed March 27, 1961

Inventor:
Frederick T. Riddy
By: Scrivener + Parker
Attorneys

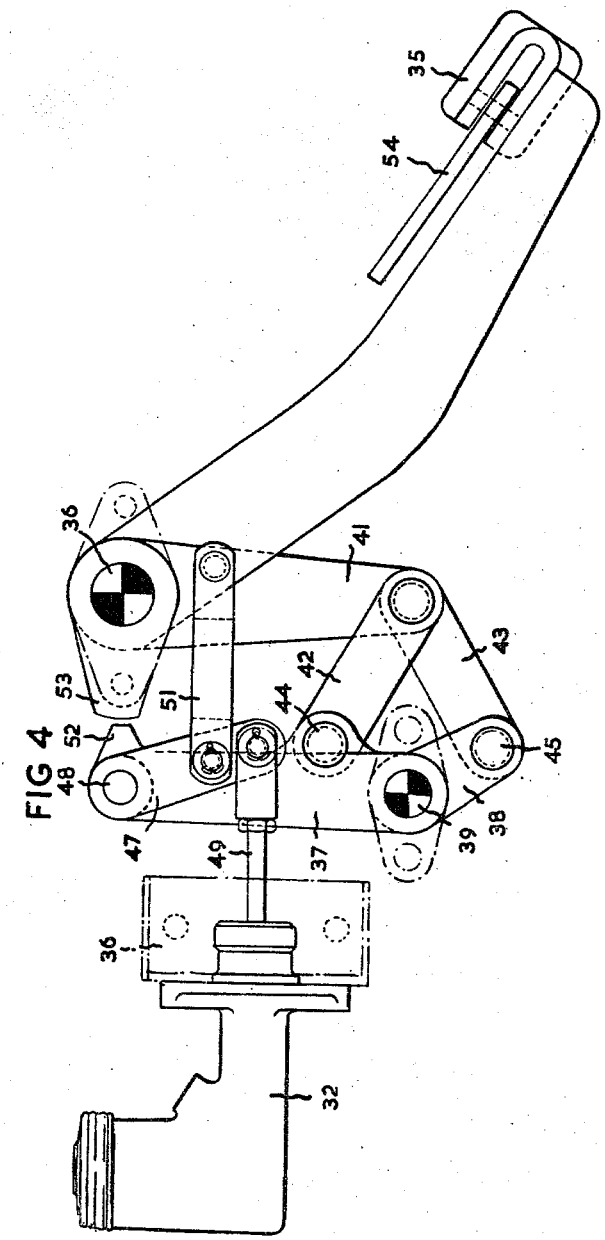

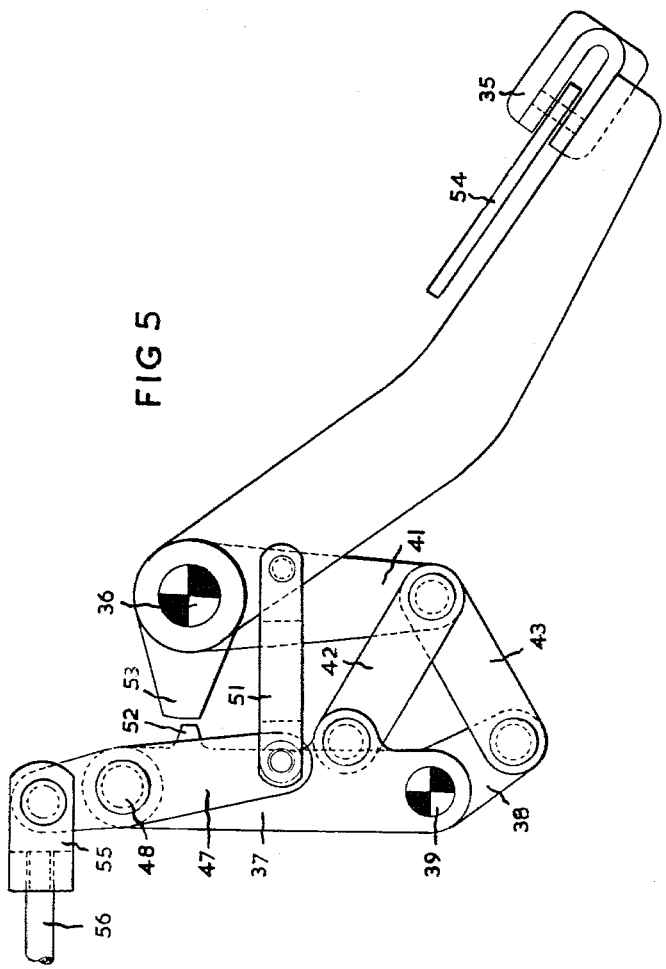

_United States Patent Office_

3,181,388
Patented May 4, 1965

3,181,388
BRAKING SYSTEMS FOR VEHICLES
Frederick Thomas Riddy, Erdington, Birmingham, England, assignor to Girling Limited, a British company
Filed Mar. 27, 1961, Ser. No. 98,355
4 Claims. (Cl. 74—478)

This invention relates to improvements in braking systems for vehicles of the kind in which two brakes or sets of brakes are applied by separate actuating means which can be actuated independently or simultaneously.

For example on vehicles such as agricultural tractors in which the brakes are used for steering purposes, as well as for the normal retardation of the movement of the vehicle, it is a usual practice to employ two independent braking systems, each applying the brake or brakes on one side of the vehicle for steering purposes. The brakes are applied by separate pedals or levers which can be locked together when all the brakes are to be applied simultaneously for normal retardation of the vehicle.

In braking systems of this kind, it is a matter of difficulty to provide for compensation of the brakes on the two sides of the vehicle when all the brakes are applied in normal traveling and at the same time to provide for independent operation of the brakes on one side or the other of the vehicle for steering purposes.

According to my invention, in a braking system for vehicles incorporating two brakes or sets of brakes applied by separate pedals or levers which can be operated independently or simultaneously, a compensating device is arranged between the systems to compensate for differences in brake lining wear when both pedals or levers are operated and the device is held against compensating movement when only one pedal or lever is operated.

In one convenient arrangement in which the two brakes or sets of brakes are applied hydraulically by separate master cylinders, the pistons of the master cylinders are actuated by separate pedals which are angularly movable about a common axis and the master cylinders are mounted in brackets pivotally attached to opposite ends of compensating levers pivoted to move angularly about fixed axes at the middle of their lengths, each bracket carrying an abutment which engages with a complementary abutment on the corresponding pedal to prevent angular movement of the compensating levers when only one pedal is operated, and the abutments on the pedals being carried clear of the abutments on the brackets when both pedals are operated so that the compensating levers are then free to move angularly to compensate for differences in brake lining wear in the two brakes or sets of brakes.

In another arrangement two separate brake applying members which may be hydraulic or mechanical are actuated by separate pedals through bars coupled to the pedals and to the brake applying members and pivotally mounted on the free ends of normally parallel levers which pivot about a common fixed axis and are coupled to an angularly movable arm for angular movement in opposite directions about their axis. The levers carry abutments adapted to co-operate with abutments on the pedals in such a way that when a brake or set of brakes is applied by depression of either pedal, angular movement of the lever associated with the other pedal is prevented, but when both pedals are depressed both levers are free to move angularly to provide compensation between the two brakes or sets of brakes.

Two practical forms of brake compensating mechanism in accordance with my invention are illustrated by way of example in the accompanying drawings in which:

FIGURE 4 is a side elevation of the mechanism shown in FIGURE 3; and

FIGURE 5 is a side elevation similar to FIGURE 4, but showing a modification of the mechanism for applying the brakes mechanically.

Figure 1:
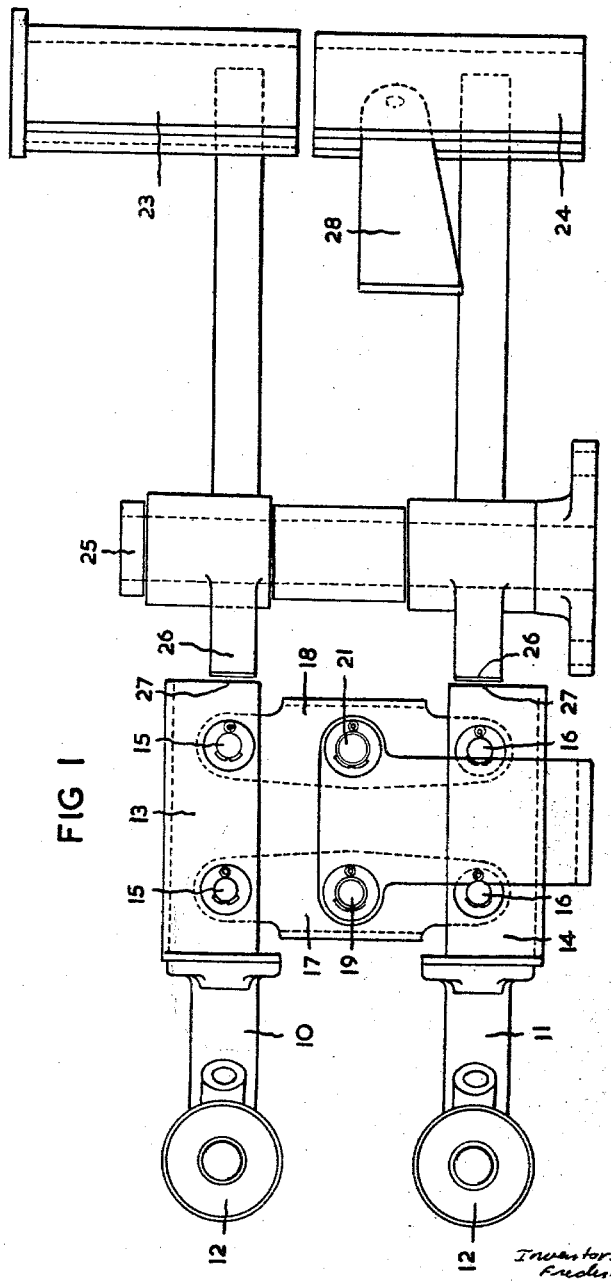
FIGURE 1 is a plan of one form of the mechanism.
Figure 2:
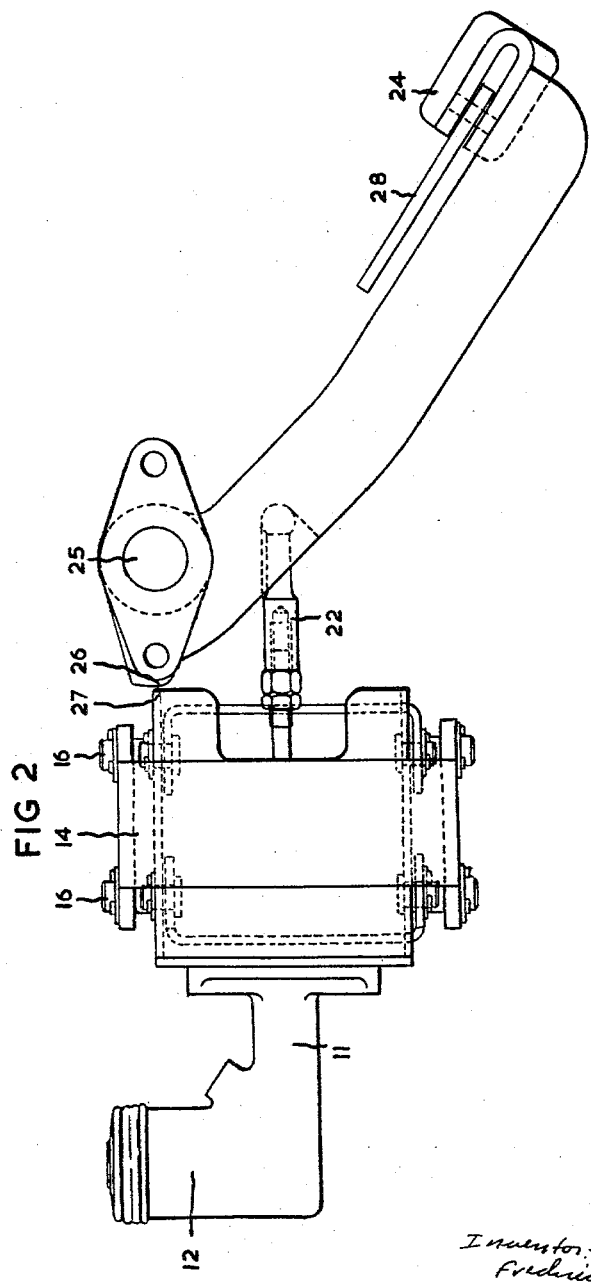
FIGURE 2 is a side elevation of the mechanism shown in FIGURE 1.

In the arrangement shown in FIGURES 1 and 2 the brakes on one side of the vehicle are applied by an hydraulic master cylinder 10 and those on the other side, by a parallel master cylinder 11. Reservoirs 12, for working fluid, are integral with the master cylinders. The master cylinder 10 is mounted in a channel-section bracket 13 and the master cylinder 11 is mounted in a complementary bracket 14, and the brackets are mounted by means of pivot pins 15, 16 on opposite ends of spaced parallel compensating levers 17, 18 extending substantially at right angles to the axes of the master cylinders. The compensating levers 17, 18 are pivotally mounted at the middle of their lengths by means of pivot pins 19, 21 on a fixed part of the vehicle structure.

The pistons in the master cylinders are actuated through push rods 22 by separate pedals 23, 24 which are mounted for angular movement on a fixed shaft 25 of which the axis is at right angles to the axes of the master cylinders. Each pedal is extended beyond the shaft to provide an abutment 26 which, in the normal position of the pedal shown in the drawings, is in contact with or is only spaced a short distance from a complementary abutment 27 on the adjacent end of the bracket carrying the master cylinder actuated by that pedal.

A link 28 pivoted on the pedal 24 can be swung across to couple the two pedals together.

When one pedal only is depressed the compensating levers move angularly about their pivots and the bracket carrying the inoperative master cylinder is moved towards its pedal until the abutment 27 on the bracket engages the abutment 26 on the pedal. The compensating levers are then held against further movement and the full effort of the actuated pedal can be applied to its master cylinder.

When the two pedals are locked together by the link 28, both pedals move simultaneously and their angular movement about the shaft 25 carries the abutments 26 on the pedals clear of the abutments 27 on the brackets so that the compensating levers are free to move angularly about their pivots to equalize the pressures in the two master cylinders and compensate for unequal wear of the brake linings in the two brakes or sets of brakes.

Figure 3:
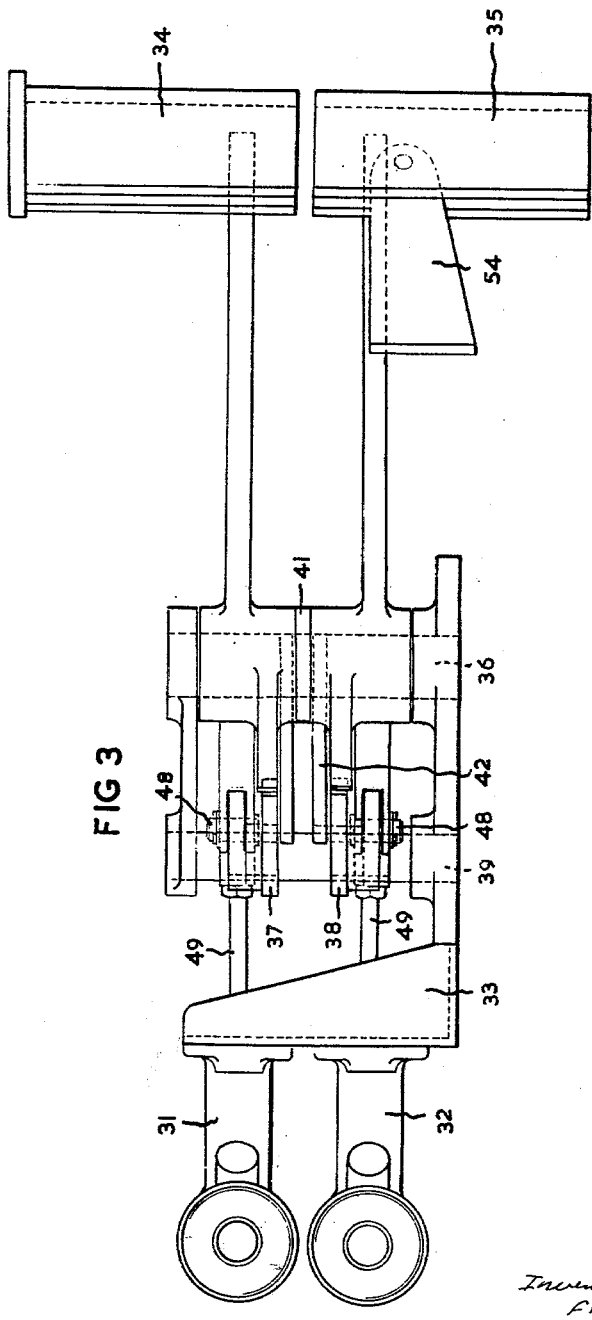
FIGURE 3 is a plan of an alternative form of mechanism.

In the modification shown in FIGURES 3 and 4, brakes on opposite sides of a vehicle are applied by parallel master cylinders 31, 32 rigidly mounted on a stationary bracket 33.

The master cylinders are actuated by pedals 34, 35 mounted for angular movement about a stationary shaft 36 located above the level of the axes of the master cylinders, and at right angles to them. Between the shaft 36 and the master cylinders are two normally parallel levers 37 and 38 extending upwardly from and angularly movable about a fixed spindle 39 located at a lower level than and parallel to the shaft 36. The lever 38 is extended downwardly for a short distance below the axis of the spindle 39. An arm 41 substantially parallel to the levers 37 and 38 is mounted on the shaft 36 between the pedals and extends downwardly from the shaft about which it is angularly movable. The free end of the arm 41 is pivotally connected by oppositely inclined links 42, 43 to points 44, 45 on the levers 37 and 38 respectively above and below the arm of the spindle 39.

A bar 47 is pivotally mounted at 48 on the free end of each lever 37, 38 and the free end of the bar is pivotally coupled by a thrust-rod 49 to the piston of a master cylinder. At an intermediate point in its length, the bar 47 is pivotally connected by a link 51 to one of the brake pedals.

At or adjacent to its free end, each of the levers 37 and 38 carries an abutment 52 which, in the off-position of the mechanism shown in the drawings, is in contact with or closely adjacent to a complementary abutment 53 on the corresponding pedal.

When either pedal is depressed to apply the brake or brakes on one side of the vehicle, that pedal, through the link 51 connected to it, moves the corresponding bar 47 angularly about its pivot on the corresponding lever 37 or 38, and the free end of the bar actuates the piston of the master cylinder coupled to it.

The lever 37 or 38 on which the actuated bar 47 is mounted tends to move angularly with the bar about the fixed axis of the spindle 39 and this movement, through the link 42 or 43, causes angular movement of the arm 41 about the shaft 36. The movement of the arm 41 is transmitted through the other link 43 or 42 to the other lever 38 or 37 which is moved in the reverse direction until the abutment 52 on that lever engages the complementary abutment 53 on the non-actuated pedal. Further angular movement of both levers is then prevented and the whole of the movement of the actuated pedal is transmitted through the associated bar 47 to the piston of the actuated master cylinder.

When the pedals are coupled together by a link 54 and depressed simultaneously for normal retardation of the vehicle, the abutments 52 on the pedals are carried clear of the abutments 53 on the levers 37 and 38 and relative angular movement of the levers is permitted to compensate for differences in the wear in the brakes on opposite sides of the vehicle.

If the brakes are applied mechanically through thrust members instead of hydaulically, the thrust members can be coupled to the bars 47 at the same points as the thrust rods 49.

Alternatively, if the brakes are applied mechanically through rods or cables operating in tension the arrangement shown in FIGURE 5 can be employed. In this arrangement, the bars 47 are extended above their pivotal mountings on the levers 37 and 38 to receive forks 55 on the rods or cables 56.

I claim:
1. A braking system for vehicles having two sets of brakes comprising two driver-operable means angularly movable independently or simultaneously about a common stationary axis in a fixed member, two brake applying members for applying said sets of brakes and of which each brake applying member is operatively connected to one of said driver operable means, a compensating mechanism pivotally connected to a second fixed member and interconnecting each of said brake applying members, and means providing on said driver-operable means for preventing movement of said compensating mechanism upon operation of one of said driver operable means alone and rendered inoperative upon simultaneous operation of both of said driver operable means to permit free movement of said compensating mechanism.

2. A braking system for vehicles having two sets of brakes comprising two pedals carrying abutments and angularly movable independently or simultaneously about a common stationary axis in a fixed member, two brake applying members for applying said sets of brakes and of which each brake applying member is operatively connected to one of said pedals, a compensating mechanism pivotally connected to a second fixed member and interconnecting said brake applying members, second abutments carried by said compensating mechanism and engageable with said abutments carried by said pedals to positively locate said compensating mechanism against movement upon operation of either of said pedals alone, said abutments carried by said pedals being moved clear of said second abutments carried by said compensating mechanism to permit free compensating movement of the latter upon simultaneous operation of both of said pedals.

3. A braking system for vehicles having two sets of brakes comprising two pedals carrying abutments and angularly movable independently or simultaneously about a common stationary axis in a fixed member, two brake applying members for applying said sets of brakes and of which each brake applying member is operatively connected to one of said pedals, a compensating mechanism interconnecting said brake applying members, said mechanism comprising compensating lever means having a central pivot in a second fixed member about which said lever means is angularly movable, brackets pivotally attached to opposite ends of said compensating lever means in which said brake applying members are mounted, second abutments carried by the ends of the brackets adjacent to the pedals and engageable with the abutments carried by said pedals to positively locate said compensating lever means against angular movement upon engagement of either of the second abutments carried by its respective bracket with the co-operating abutment carried by the corresponding pedal upon operation of the other pedal alone, said abutments carried by said pedals being moved clear of said second abutments to permit angular movement of said compensating lever means about the pivot thereof in said stationary member upon simultaneous operation of both of said pedals.

4. A braking system for vehicles having two sets of brakes comprising two pedals carrying abutments and angularly movable independently or simultaneously about a common stationary axis in a fixed member, two brake applying members for applying said sets of brakes and of which each brake applying member is operatively connected to one of said pedals, a compensating mechanism interconnecting said brake applying members, said mechanism comprising two normally parallel compensating levers angularly movable about an axis in a second fixed member and parallel to that about which the pedals move, bars pivotally mounted on the free ends of said levers and each pivotally coupled to a brake applying member and to a pedal, an angularly movable arm pivotally fixed at one end for movement about an axis parallel to the axis of said compensating levers, links connecting the free end of said arm to said levers on opposite sides of their axis whereby angular movement of either lever moves the other lever in the opposite direction, and second abutments on said levers and cooperating with the abutments on said pedals for preventing compensating movement of said levers when either pedal is actuated alone, said abutments carried by said pedals being moved clear of said second abutments to permit angular movement of the compensating levers upon simultaneous operation of both of said pedals.

References Cited by the Examiner
UNITED STATES PATENTS

| | | | |
|---|---|---|---|
| 2,367,064 | 1/45 | Shoemaker et al. | 74—478 |
| 2,443,331 | 1/48 | Stewart | 74—480 |
| 2,504,258 | 4/50 | Elenewicz | 74—478.5 |
| 2,894,608 | 6/59 | Writtren | 74—478.5 |
| 2,989,875 | 6/61 | Torrance | 74—478 |

BROUGHTON G. DURHAM, *Primary Examiner.*